G. C. DAVISON.
MECHANICAL CUT-OUT GEAR.
APPLICATION FILED AUG. 5, 1916.
1,237,024.
Patented Aug. 14, 1917.
3 SHEETS—SHEET 1.
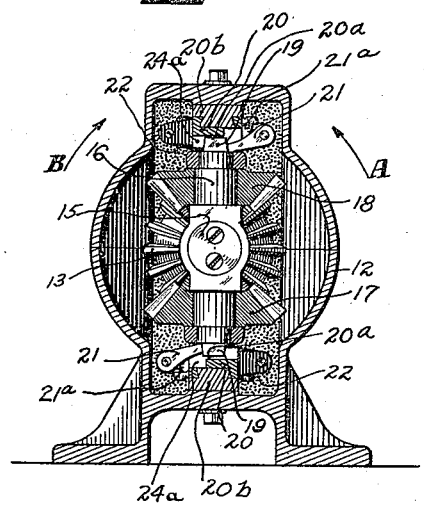
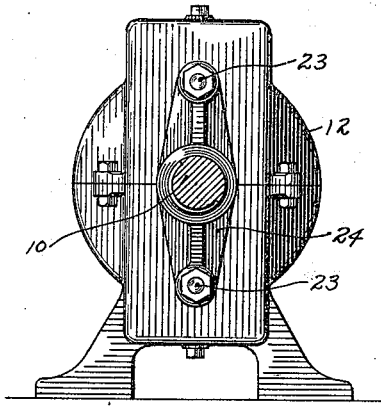
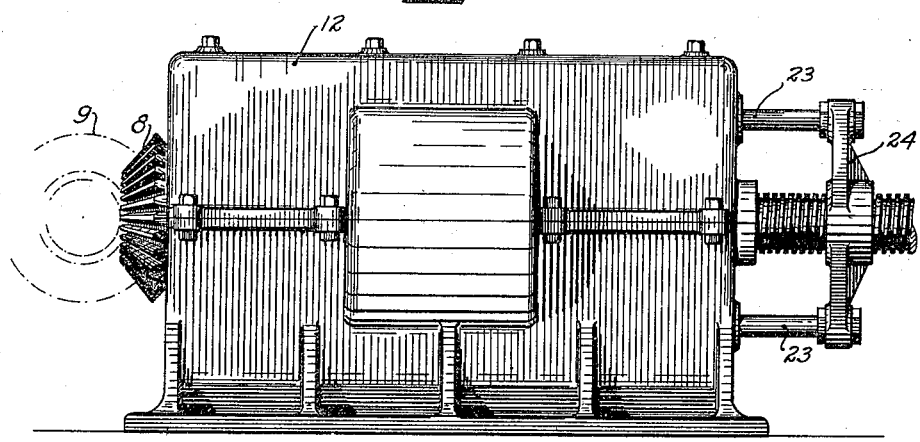
INVENTOR
Gregory C. Davison
BY
Pennie, Davis and Marvin
his ATTORNEYS

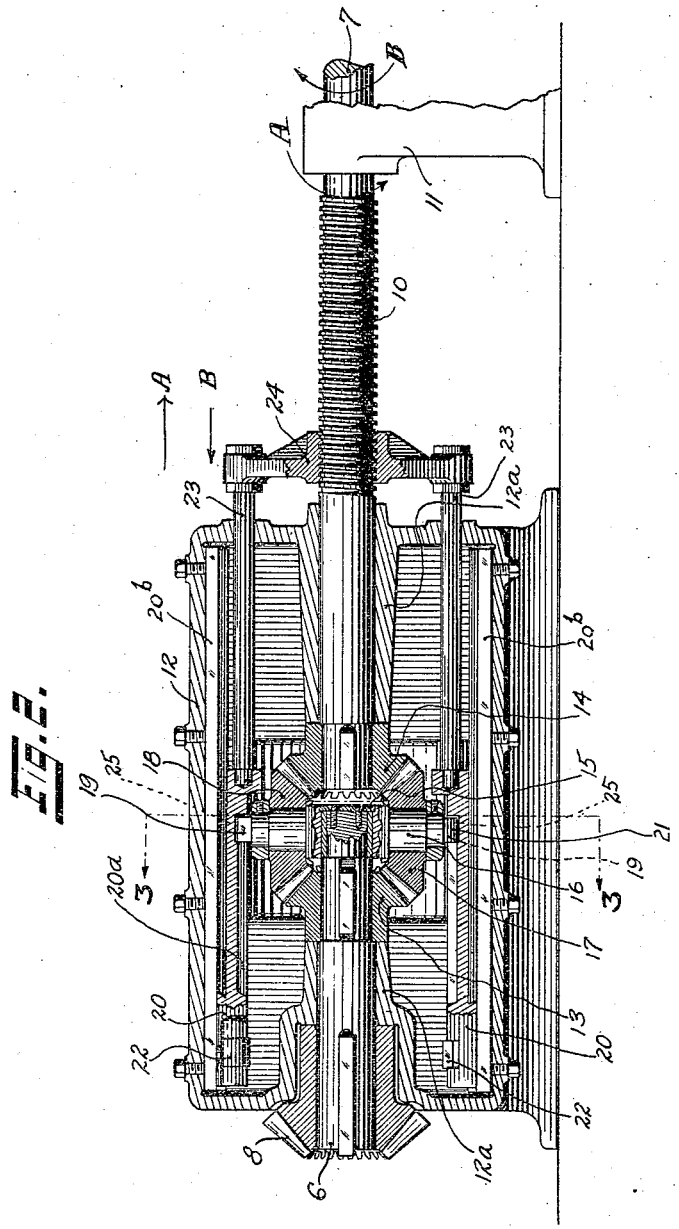

G. C. DAVISON.
MECHANICAL CUT-OUT GEAR.
APPLICATION FILED AUG. 5, 1916.
1,237,024.
Patented Aug. 14, 1917.
3 SHEETS—SHEET 3.
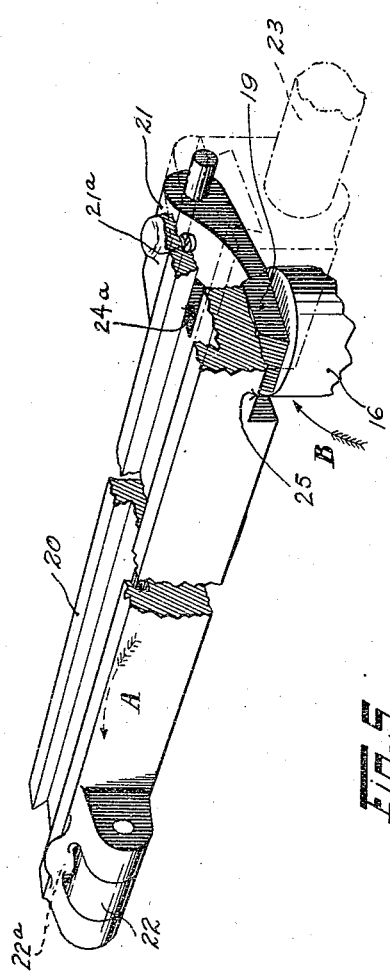
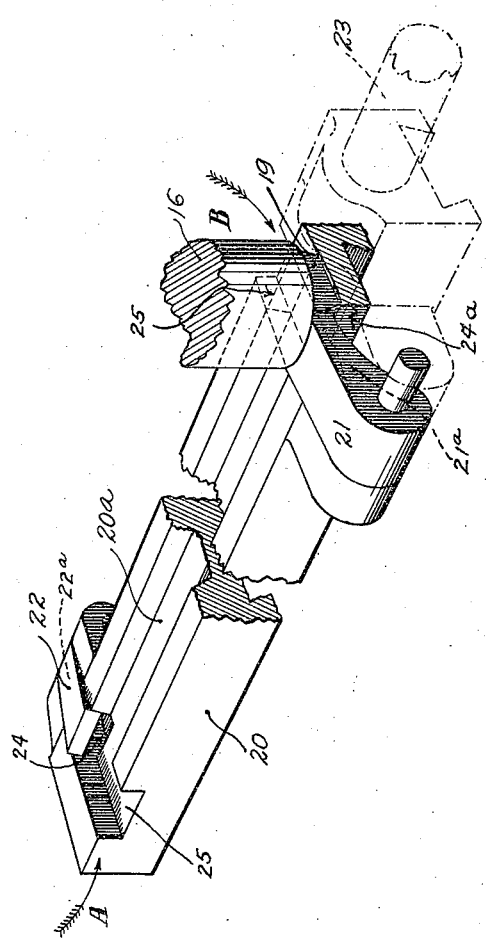
INVENTOR
Gregory C. Davison
BY
Pennie Davis & Marvin
his ATTORNEYS

UNITED STATES PATENT OFFICE.

GREGORY C. DAVISON, OF NEW LONDON, CONNECTICUT, ASSIGNOR TO ELECTRIC BOAT COMPANY, OF NEW YORK, N. Y., A CORPORATION OF NEW JERSEY.

MECHANICAL CUT-OUT GEAR.

1,237,024.  Specification of Letters Patent.  Patented Aug. 14, 1917.

Application filed August 5, 1916. Serial No. 113,262.

*To all whom it may concern:*

Be it known that I, GREGORY C. DAVISON, a citizen of the United States, and a resident of New London, in the county of New London and State of Connecticut, have invented certain new and useful Improvements in Mechanical Cut-Out Gears; and I do hereby declare the following to be a full, clear, and exact description of the invention, such as will enable others skilled in the art to which it appertains to make and use the same.

This invention relates to mechanical "cutout" gears to be interposed between a driving shaft and a driven shaft to stop the driven shaft after a predetermined number of revolutions.

One object of the invention is to provide a device of this character in which, when the driven shaft reaches its stop position, the connection between the shafts is altered so that the driving shaft may continue to rotate in the same direction, overrunning the driven shaft, but if the direction of rotation of the driving shaft is reversed the driven shaft will be positively driven in the reverse direction for a predetermined number of revolutions, resetting the parts for another operation when the direction is again reversed. By this mechanism a member operated by the driven shaft will be given an operation of definite amplitude upon each reversal of the direction of rotation of the driving shaft, regardless of the number of rotations of the driving shaft.

A further object of the invention is to provide a mechanism of this character wherein the driving and driven shafts may be coaxially arranged and wherein all rapidly moving parts of the mechanism are entirely inclosed within and protected by a fixed casing.

A further object of the invention is to provide a mechanism wherein the two shafts are at all times positively coupled for rotation in one or the other direction.

In the drawings, which show a preferred embodiment of the invention,

Figure 1 is a side elevation of said embodiment;

Fig. 2 is a vertical section taken axially;

Fig. 3 is a transverse sectional view on the line 3—3 of Fig. 2;

Fig. 4 is an end elevation of the parts shown in Fig. 1; and

Fig. 5 is a perspective view of certain of the parts shown in Figs. 2 and 3.

The reference numerals 6 and 7 indicate respectively a driving shaft and a driven shaft, the driving shaft having keyed thereon a beveled gear 8 adapted to mesh with a power driven similar gear 9 (Fig. 1). The driven shaft 7 is exteriorly threaded at 10 and beyond such threads it is journaled in a bearing 11. Shafts 6 and 7 are supported in alined bearings 12$^a$ carried integrally by the upper and lower halves of casing 12. Beveled gears 13 and 14 are respectively keyed on the ends of shafts 6 and 7 which project inwardly of the casing 12 and beyond the bearings 12$^a$.

The end of shaft 6 is extended beyond the face of the gear 13 to provide a bearing for a sleeve carrying two opposite, radially projecting shafts 16 on which are mounted bevel gears 17, 18, meshing with the gears 13 and 14 and forming a driving connection between the shafts 6 and 7. The sleeve supporting the shafts 16 is held in place for rotation on the shaft 6 by means of a plate 15 attached to the end of the shaft.

The casing 12 has mounted therein two oppositely located and longitudinally extending fixed guides 20$^b$ having under-cut edges and upon each of these guides is mounted a slide-block 20. Each block 20 has formed in its inner face a track or keyway 20$^a$ into which extends the squared head 19 of one of the shafts 16.

The blocks 20 are moved longitudinally of their guides 20$^b$ by rods 23 attached to the blocks and to a nut or traveler 24 working on a threaded portion 10 of driven shaft 7 without the casing 12, the rods working through holes in the end wall of the casing.

At each end of the tracks or keyways 20$^a$ one side wall is cut away or slotted as indicated at 25 to permit the squared ends of the shafts 16 to pass out of the keyways when the blocks 20 are adjusted to bring the ends of the shafts to the ends of the keyways, the slots 25 at the opposite ends of the keyways being in the opposite side walls thereof to permit the rotary movement of the shafts and intermediate gears in one direction only when the blocks are at one extreme position and in the opposite direction only when the blocks are at the other extreme position. At any intermediate position of the blocks 20 the intermediate gears are held against bodily movement around the axis of the shaft 6 and consequently act as simple idlers to transmit the rotation of the shaft 6 to the shaft 7 but in a reverse direction.

In order to permit continuous rotation of the intermediate gear carrier around the axis of the main shafts when the blocks 20 are in either of their extreme positions, the side walls of the keyways 20$^a$ opposite the slots 25 are formed of pawls 21 and 22 spring held by suitable springs as indicated at 21$^a$ with their ends flush with the inner face of the adjacent wall of the keyway, the pawls being pivoted to the blocks at points sufficiently distant from the orbit of movement of the ends of the shafts 16 for the ends of the shafts to engage the inner face of the pawls and press them outwardly into recesses 24$^a$ in the blocks until the shafts clear the pawls. Upon rotation of the intermediate gears in a reverse direction around the axis of the alined shafts 6 and 7 the ends of the shafts 16 engage the ends of the pawls as indicated in Fig. 5 and are locked against rotation so that in this direction of rotation the intermediate gears will act as idlers transmitting the rotation of the driving shaft to the driven shaft.

The operation of the mechanism is as follows:

Assume that the parts are in the positions shown in Fig. 2 and it is desired to rotate the driven shaft 7 in the direction of the curved arrow A and to the predetermined extent for which the machine is designed. The driving shaft 6 will be set in motion in a reverse direction, that is, the driving shaft will be rotated in the direction of the curved arrow B of Fig. 2. Thereupon the heads 19 engage with the pawls 21, and hold the intermediate gears 17 and 18 against rotation with the driving shaft 6, so that the driven shaft 7 commences to rotate in the direction of the curved arrow A. As soon as the driven shaft 7 commences to rotate in the direction of the curved arrow A the traveler 24 moves in the direction of the straight arrow A of Fig. 2, and moves the blocks 20 in that direction. Since the traveler 24 is moving away from the casing 12 all the time the driven shaft 7 is rotating in the direction of the curved arrow A, the traveler 24 will gradually move the blocks 20 lengthwise until the heads 19 are brought opposite the pawls 22 in line with the slots 25. The intermediate gears and their shafts will now be free to revolve around the axis of the driving shaft in the direction in which it is rotating and will consequently no longer transmit power to the driven shaft 7, the gear of the driven shaft acting as a stationary rack causing the intermediate gears to rotate on their own axes as they are revolved around the face of the gear.

The pawls 22 will allow the ends of the shafts 16 to pass freely in this direction of rotation and the driving shaft may continue to rotate for an indefinite period without further rotating the driven shaft which will have stopped after an exact number of rotations equal to the number of threads in a length of the screw 10 equal to the distance between the pawls 21 and 22, or more accurately, equal to the distance between the inner edges of the two slots 25 plus the width of the squared end of one of the shafts 16.

Should it be desired to reverse the direction of rotation of the driven shaft 7, the driving shaft is reversed which will reverse the direction of rotation of the shafts 16 and intermediate gears around the axis of the shaft 6 thereby bringing the projections 19 against the ends of the pawls 22, which will lock the intermediate gears against further rotation around the axis of the driving shaft. The intermediate gears will then transmit the rotation of the driving shaft in the direction of the arrow A to the driven shaft in the direction of the arrow B (Fig. 2), and the rotation of the driven shaft will cause the nut 24 to travel in the direction of the arrow B thereby bringing the projection 19 into the keyways 20$^a$ which will hold the intermediate gears against rotation around the axis of the driving shaft until the nut 24 again reaches the position shown in Fig. 2. In this position the projection 19 will pass out of the keyway and come opposite the pawls 21 where the projections are free to move out of the keyways in the direction of the arrow A as clearly shown in Fig. 3, whereby the driven shaft will stop and the intermediate gears with their shafts and supporting sleeve will rotate idly with the driving shaft.

The stopping of the driven shaft will obviously occur after it has rotated in the reverse direction for the exact number of rotations which took place in the first described direction, whereby the member operated by the driven shaft will be returned to the exact position which it originally occupied.

It will be seen that a connection is provided between the driving shaft 6 and the driven shaft 7 for effecting rotation of the driven shaft to the extent of a predetermined number of revolutions in either direction; the head 19 of one of the shafts 16 and one of the blocks 20 constituting a pair of coöperant clutch-members for coupling the driving and driven shafts during rotation of the driving shaft in either direction when such head 19 is engaged with the block intermediate the ends of the track or keyway thereof.

My improved cut-out mechanism will be particularly useful for adjusting parts from a definite operative to an inoperative position, and vice versa, where considerable power is required to effect the adjustment. One such use which may be mentioned is the adjustment of the bow rudders of submarine boats, which rudders are folded or extended according to the desired operation of the boat. To adjust the rudders the operator has merely to start the motor or other driving connection for the gear 8$^b$ in the proper direction and let it run for a sufficient time to be sure that the full movement of the rudder has been accomplished. The rudder will automatically stop when the full adjustment is accomplished without attention from the operator.

I claim:

1. In a power transmitting mechanism the combination of a driving and a driven member, means between said members for effecting the rotation of the driven member from the driving member, said means comprising a connection operative in one direction of rotation of the driving member, and means operated by the movement of the members after a predetermined number of revolutions for rendering said connection inoperative in the then direction of rotation of the driving member but not in the opposite direction.

2. In a power transmitting mechanism the combination of a driving and a driven member, means between said members for effecting the rotation of the driven member from the driving member, said means comprising a connection operative in both directions of rotation of the driving member, and means operated by the movement of the members after a predetermined number of revolutions for rendering said connection inoperative in the then direction of rotation of the driving member and maintaining said coupling operative in the opposite direction of rotation of the driving member.

3. In a power transmitting mechanism the combination of a driving and a driven member, connections between said members comprising means for transmitting movement of the driving member to the driven member and a control mechanism for said means for rendering the driving connections inoperative in the then direction of rotation of the driving member after a predetermined number of revolutions of the driven member while maintaining the driving connection operative in the reverse direction of rotation, said control mechanism being simultaneously reversed and then operative to disconnect the driven mechanism after an equal number of rotations in the opposite direction.

4. In a power transmitting mechanism the combination of a driving and a driven member, driving connections between said members operative in one position of adjustment to transmit power in one direction of rotation and in another position of adjustment to transmit power in the opposite direction of rotation of the driving member, and a control mechanism for said driving connections operated by the rotation of the driven member to adjust said driving connections from one said position to the other said position after a predetermined number of revolutions of the said driven member.

5. In a power transmitting mechanism the combination of a driving and a driven member, driving connections between said members operative in one position of adjustment to transmit power in one direction of rotation and in another position of adjustment to transmit power in the opposite direction of rotation of the driving member, the said driving connections being designed to permit overrunning of the driving member in one direction of rotation in each of the said positions of adjustment, and a control mechanism for said driving connections operated by the rotation of the driven member to adjust said driving connections from one said position to the other said position after a predetermined number of revolutions of the said driven member.

6. In a power transmitting mechanism the combination of a driving and a driven member, driving connections between said members operative in one position of adjustment to transmit power in one direction of rotation and in another position of adjustment to transmit power in the opposite direction of rotation of the driving member, the said driving connections being designed to permit overrunning of the driving member in one direction of rotation in each of the said positions of adjustment, and a control mechanism for said driving connections operated by the rotation of the driven member to adjust said driving connections from one said position to the other said position after a predetermined number of revolutions of the said driven member, said control mechanism being operative in either direction of rotation of the driven member to effect a reversal of the driving connection whenever the driven shaft is rotated a predetermined number of revolutions in either direction.

7. In a power transmitting mechanism the combination of a driving and a driven member, gearing between said members operated to transmit the movement from the driving member to the driven member in either direction of rotation, a control mechanism for said gearing operated by the rotation of the driven member to render said gearing inoperative in one direction of rotation of the driving member after a predetermined number of revolutions of the driven member in one direction and for maintaining the gearing operative for transmission of movement in the reverse direction of rotation of the driving member.

8. In a power transmitting mechanism the combination of a driving and a driven member, a planetary gearing between said members comprising a rotatably mounted gear carrier and means for controlling the rotation of said gear carrier comprising means operated by the rotation of the driven member for holding said gear carrier against rotation in one direction of movement for a predetermined number of revolutions of the driven member and for releasing the gear carrier for movement in that direction of rotation after the completion of the predetermined number of revolutions.

9. In a power transmitting mechanism the combination of a driving and a driven member, a planetary gearing between said members comprising a rotatably mounted gear carrier, a locking device for said gear carrier comprising a part mounted for longitudinal movement adjacent said gear carrier and held against rotation, a projection on said gear carrier engaging said part, said part being designed to release said projection in one direction of rotation in one position of its longitudinal movement, and connections between said part and said driven member for longitudinally adjusting said part to its release position after a predetermined number of revolutions of said driven member.

10. In a power transmitting mechanism the combination of a driving and a driven member, a planetary gearing between said members comprising a gear fixed to said driving member and a gear fixed to said driven member, an intermediate gear meshing with both said first mentioned gears, a carrier for said intermediate gear mounted for rotation about the axis of said first mentioned gears, a locking device for said gear carrier comprising a bar mounted for longitudinal movement parallel with said axis of rotation, a projection on said gear carrier engaging said bar, operating connections between said bar and said driven shaft for adjusting said bar longitudinally upon rotation of said driven shaft, and means at each end of said bar for releasing said projection in one direction of rotation when by the longitudinal movement of the bar its end is brought into coöperative position with said projection.

11. In a power transmitting mechanism the combination of line driving and driven shafts, gears fixed to the adjacent ends of said shafts, an intermediate gear meshing with both said first mentioned gears, a carrier for said intermediate gear mounted for rotation about the axis of said shafts, said carrier having a radial projection, a channel bar mounted for longitudinal movement in a direction parallel with the axis of rotation with its channel embracing the said projection, said channel bar having its walls cut away at each end to permit the passage of said projection across the path of said channel, a pawl mounted in one side of said channel at its cut away portion at each end, the said pawls being oppositely arranged, and means for shifting said bar longitudinally comprising a part threaded on the driven shaft and connected to said bar.

12. In a power transmitting mechanism the combination of a driving and a driven member, means between said members for effecting the rotation of the driven member from the driving member, said means comprising a connection operative in one direction of rotation of the driving member, and means operated by the movement of the members after a predetermined number of revolutions for rendering said connection inoperative in the then direction of rotation of the driving member but not in the opposite direction, said connection including a pair of coöperant clutch-members one stationary while the connection is operative.

13. In a power transmitting mechanism the combination of a driving and a driven member, means between said members for effecting the rotation of the driven member from the driving member, said means comprising a connection operative in both directions of rotation of the driving member, and means operated by the movement of the members after a predetermined number of revolutions for rendering said connection inoperative in the then direction of rotation of the driving member and maintaining said coupling operative in the opposite direction of rotation of the driving member, said connection including a pair of coöperant clutch-members one of which is operatively connected to the driving member and so arranged that the driving member and the last mentioned clutch-member are relatively movable during driving of the driven member by the driving member.

14. In a power transmitting mechanism the combination of a driving and a driven member, driving connections between said members operative in one position of adjustment to transmit power in one direction of rotation and in another position of adjustment to transmit power in the opposite direction of rotation of the driving member, said driving connections including a pair of coöperant relatively movable clutch-members one of which is stationary during rotation of the driven member, and a control mechanism for said driving connections operated by the rotation of the driven member to adjust said driving connections from one said position to the other said position after a predetermined number of revolutions of the said driven member.

15. In a power transmitting mechanism the combination of a driving and a driven member, driving connections between said members operative in one position of adjustment to transmit power in one direction of rotation and in another position of adjustment to transmit power in the opposite direction of rotation of the driving member, the said driving connections being designed to permit overrunning of the driving member in one direction of rotation in each of the said positions of adjustment and these connections including a pair of coöperant clutch members one of which is moved relative to the other during rotation of the driven shaft and the other of which is moved relative to the first during over-running of the driving shaft, and a control mechanism for said driving connections operated by the rotation of the driven member to adjust said driving connections from one said position to the other said position after a predetermined number of revolutions of the said driven member.

In testimony whereof I affix my signature.

GREGORY C. DAVISON.

Copies of this patent may be obtained for five cents each, by addressing the "Commissioner of Patents, Washington, D. C."